Nov. 16, 1965 M. ACHTERHOF ETAL 3,218,215
ADHERING POLYURETHANE TO METAL
Filed April 27, 1960

INVENTOR.
MARVIN ACHTERHOF
NELSON L. HAVENS
BY
Oberlin, Maky & Donnelly
ATTORNEYS

United States Patent Office 3,218,215
Patented Nov. 16, 1965

3,218,215
ADHERING POLYURETHANE TO METAL
Marvin Achterhof and Nelson L. Havens, Willoughby, Ohio, assignors to The Eagle-Picher Company, Cincinnati, Ohio, a corporation of Ohio
Filed Apr. 27, 1960, Ser. No. 25,053
6 Claims. (Cl. 156—321)

The present invention relates to an adhesive for securing a polyurethane, and particularly those elastomeric polyurethanes cross-linked to a degree obtained by post-curing, to a metal support or workpiece.

The term "polyurethane" refers to a class of polymers that represent culmination of organic research based on the isocyanates. In general, a urethane may be considered an ester of carbamic acid, and a polyurethane may be regarded as a polymer of the ester in which the repeating unit is a urethane linkage. One method employed for the production of the urethane linkage is the reaction of the isocyanate radical with a compound or radical having an active or reactive or labile hydrogen atom such as the hydroxyl and amino radicals. Thus, polyurethanes may be generally defined as polymers produced by the addition reaction between organic isocyanates and active hydrogen-containing compounds, such as glycols, polyesters, polyethers, polyols, polyamides, polyamines, phenols, or with compounds containing carboxylic acid, amino, or amido radicals.

When in such a reaction, an organic diisocyanate is used together with a reactant having bi-functional groups, each group having an active hydrogen atom, for example a diol, a polymer is produced having a relatively large molecule. In polymerizing, the active hydrogen atom shifts to the nitrogen atom of the isocyanate radical. The polymer of these reactants is substantially linear or straight-chained and normally exhibits thermoplasticity or heat sensitivity. These properties are thought to result from a linear polyurethane because each of such relatively large straight-chain molecules is not chemically bonded with companion macro-molecules, and therefore the physical relationship of the molecules inter se is not fixed. Freedom of these molecules to move relatively to each other provides the thermoplasticity. Because of such thermoplasticity, these polymers tend to acquire an adherence to metal, when applied in a fluid state, which is satisfactory to a relative degree. However, for some applications where the polymer is subject to rather severe stresses and strains, the adherence is not satisfactory.

Further, when in such a reaction as initially described, the organic isocyanate or labile hydrogen-containing reactant has more than two functional groups, such as, respectively, in a tri-isocyanate or in glycerol; or if a third bi-functional reactant is included having an active hydrogen atom (such as from a hydroxyl or an amino group) which has become known in the art as a cross-linker; a substantially rigid, apparently thermoset or cured polymer is formed having a three dimensional spatial configuration. The exact mechanism is not clear. It may be that the "cross-linker" merely extends the length of the linear polymer and allophanation between the chains produces the cross-linking. Often such a polymer is further subjected to a "post-cure" operation which completely reacts all isocyanate groups, although there may be some reactive hydrogen atoms remaining. These polyurethanes, because of their three dimensional structure and lack of free isocyanate groups (or nearly so) are tougher, more resistant to wear and heat, are less active chemically and have a greater mechanical strength. Consequently, the cross-linked polyurethanes are more desirable than the linear polyurethanes for many commercial applications. For example, one successful application of a cross-linked polyurethane is as a toplift for the heels of shoes.

However, the same qualities and physical characteristics which make the cross-linked polyurethanes so desirable for wear-resistant and similar applications militate against a satisfactory adherence to metal. For instance, in the mentioned application of a toplift, it has happened that the elastomeric polyurethane toplift is stripped away from a fastener, such as a nail, merely in the course of a user's normal walking.

Furthermore, many known cements have failed to provide an acceptable adherence to a polyurethane to a metal base such as a toplift nail. Still further, since molded articles such as the toplift are usually produced by injection molding, an adhesive employed must be usable under such operating conditions as well as to provide the satisfactory adherence. One problem which is peculiarly accented in an injection molding operation is that the temperature of the material being injected has sufficiently dropped by the time it reaches the cold metal of the molds, that good adherence is difficult. Also because of the pressures involved in injection molding, the adhesive must be fairly sticky and tacky.

It is, therefore, a principal object of the present invention to provide an adhesive for a polyurethane.

Another object is to provide an adhesive for securing a polyurethane to a metal base or workpiece.

A further object is to provide an adhesive to cement a cross-linked polyurethane to a metal base.

A still further object is to provide an adhesive to cement a polyurethane completely cured, that is, a polyurethane cross-linked to a degree obtained by post-curing but preferably still containing active hydrogen atoms.

A still further object is to provide an adhesive to cement an injection molded polyurethane to a metal workpiece.

Other objects of the present invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

FORMATION OF THE ADHESIVE AND POLYURETHANE

Figure 1:
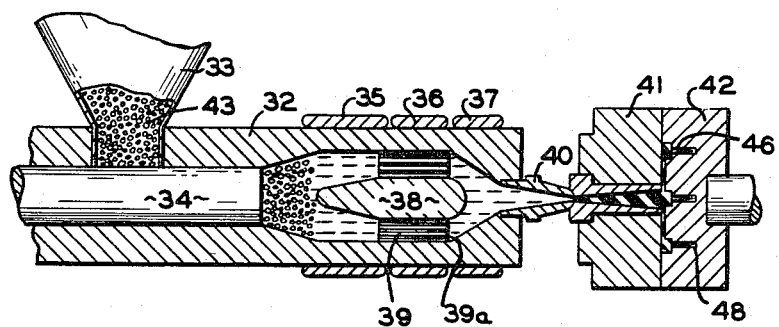
FIGURE 1 is a longitudinal section of an injection molding machine which may be used in accordance with the present invention.

In carrying out the present invention, we admix in greater or predominant amount a thermoplastic polyvinyl resin and in lesser amount an organic polyisocyanate to form an adhesive or cement. The polyvinyl resin component being present in a greater amount acts as a matrix or carrier for the polyisocyanate component. The polyvinyl resin, being a thermoplastic, also affords good adhesion with the metal, while the polyisocyanate contained intimately within such resin reacts with the polyurethane to provide a desirable double "fish-hook" connection. The net result is that the polyurethane is firmly cemented to the metal. Of course, sufficient polyisocyanate should be present to perform its described function, but in general we have found that about three to about 20 parts by weight of an organic polyisocyanate with about 90 to about 110 parts by weight of the polyvinyl resin forms satisfactory ranges. Because of the potential reaction between the organic polyisocyanate and the hydrogen atoms of the polyurethane, the present adhesive is not only operative with linear or thermoplastic polyurethanes but also with completely cured or reacted cross-linked polyurethanes, including those cross-linked to a degree obtained by post-curing. Further, the polyurethane adhesive is ideally suited for use in injection molding polyurethane where the latter is forced on or about a metal base or workpiece.

A thermoplastic polyvinyl resin which may be used includes polyvinyl acetate, polyvinyl alcohol, polyvinyl butyral, polyvinyl chloride, polyvinylidene chloride, polyvinyl formal, and copolymers and mixtures thereof. Since the organic polyisocyanates are quite active chemically, it is desirable to use polyvinyl resins having relatively low heat softening temperatures. In this manner, premature reaction of the isocyanate, as with the moisture in the air, is not promoted or accelerated. The organic isocyanate which may be used in preparing the present adhesive includes diphenylmethane-4,4′-diisocyanate; 3,3′-dimethyldiphenylmethane-4,4-diisocyanate; ethylene diisocyanate; ethylidene diisocyanate; propylene-1,2-diisocyanate; butylene-1,4-diisocyanate; hexylene-1,6-diisocyanate; cyclohexylene-1,2-diisocyanate; m-phenylene diisocyanate; p-phenylene diisocyanate; 2,4-toluylene diisocyanate; 1,6-toluylene diisocyanate; 3,3′-dimethyl-4,4′-biphenylene diisocyanate; 3,3′-dimethoxy-4,4′-diphenylene diisocyanate; 3,3′-diphenyl-4,4′-biphenylene diisocyanate; 4,4′-biphenylene diisocyanate; 3,3′-dichloro-4,4′-biphenylene diisocyanate; triphenylmethane triisocyanate; 1,5-naphthalene diisocyanate; hexamethylene diisocyanate; or polyisocyanates in a blocked or inactive form such as the bis-phenyl carbamates of toluylene diisocyanate, etc. Best results have been obtained with polyaryl polyisocyanates such as polymethylene polyphenylisocyanate. The latter is particularly advantageous due to its high degree of functionality and the spacing between the isocyanate groups. This high degree of functionality takes advantage of the cross-linking possibilities through covalent bonds of additional isocyanate groups in a chain extended polymer.

The manner of initially preparing a polyurethane, as by polyaddition, is known in the art. Reference is made, for example, to United States Patents No. 2,577,279; No. 2,620,516; No. 2,621,166; No. 2,729,618, and No. 2,764,565 for information on such preparation, such patents being hereby incorporated by reference. For instance, a polyisocyanate and a polyester or polyether, etc., are degassed, then mixed and heated within a range from about room temperature to about 300° F. If a cross-linked polymer is desired, one or both of the reactants should be tri-functional, or a cross-linker of the type hereinafter described may next be added. During the initial reaction, the cross-linked polyurethane exhibits generally thermosetting properties, that is, the polyurethane hardens and to all intents and purposes becomes infusible. This has led to attempts quickly to mold the polyurethane during this reaction and before the material has set which usually is within a very short period of time.

For identification purposes, a compound that contains a free or labile hydrogen atom, and which may be used in producing a polyurethane to be adhered to metal in accordance with the present invention, may further be described as one that will give a positive Zerewitinoff test. That is, any compound which, when added to a Grignard solution of methyl iodide, liberates methane by decomposition of the Grignard reagent. Thus a polyurethane as herein contemplated includes those reaction products of an organic polyisocyanate with a variety of other multifunctional compounds meeting the indicated test for a free or active hydrogen atom, such as those compounds having hydroxyl, carboxyl, amino, and amido groups.

The compounds most usually reacted with an organic polyisocyanate are the polyesters, such as linear or branched chain polyesters, and/or polyesteramides which contain free hydroxyl groups, and/or polyethers, and/or other groups containing reactive hydrogen atoms such as amino and/or amido groups.

Thus, the useful polyesters and/or polyesteramides may include those obtained by condensing any polybasic (preferably dibasic carboxylic) organic acid, such as adipic, sebacic, phthalic, isophthalic, terphthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, glutaric, pimelic, suberic, azelaic, etc., with polyalcohols such as ethylene glycol, diethylene glycol, pentaglycol, glycerol, sorbitol, triethanolamine, di($\beta$-hydroxyethyl) ether, etc. and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines (ethylene diamine, hexamethylene diamine, 3-methylhexamethylene diamine, decamethylene diamine, and m-phenylenediamine, etc.) and/or amino-alcohols, etc. In the esterification, the acid per se may be used for condensation or, where desirable, equivalent components, such as the acid halide or anhydride may be used.

The alkylene glycols and polyoxyalkylene glycols useful in the preparation of polyurethanes may comprise ethylene glycol, propylene glycol, butylene glycol-2,3′, butylene glycol-1,3; 2-methyl pentanediol-2,4′,2-ethylhexanediol-1,3′-hexamethylene glycol, styrene glycol, and decamethylene glycol, etc., and diethylene glycol, triethylene glycol, tetraethylene glycol, polyethylene glycols, dipropylene glycol, tripropylene glycol, polypropylene glycols.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed in preparing polyurethanes. Moreover, any organic compound containing at least two radicals selected from the class consisting of hydroxyl and carboxyl groups may be so employed. Mixed esters may also be used, such as the mixed ester of ethylene glycol and 1,2-propylene glycol with adipic acid; the mixed ester of ethylene glycol and 2,3-butylene glycol with adipic acid; and the mixed ester of ethylene glycol and diethylene glycol with adipic acid.

The polyesters used, are generally liquids of moderate molecular weight, for example 600 to 2600, and terminate principally in hydroxyl groups. The polyesters vary in their degree of branching. Linear polyesters usually lead to elastic polyurethanes and are therefore employed where more resilient products are desired, whereas the highly branched polyesters produce more rigid polyurethanes.

The organic polyisocyanates which may be employed in preparing the polyurethane may be any of those previously listed for use in compounding the present adhesive. An excess of the polyisocyanate is normally used in preparing a cross-linked polyurethane. Such excess may be in the range of about 0.20 to about 0.22 mol of the polyisocyanate for each mol of the active hydrogen-containing compound.

Where a cross-linker is used, as in preparing a three dimensional cross-linked, cured polyurethane, this reactant may include polyalcohols, such as butane diol, ethylene glycol, propylene glycol, butylene glycol, diethylene glycol, triethylene glycol, glycerol, trimethylol propane, and the like. Aromatic cross-linkers such as 1,4- di-(hydroxyethyl) benzene and hydroquinone may also be used. Non-tertiary amines, such as those described in the previously mentioned U.S. patents, because of their active hydrogen atoms can also serve as cross-linkers.

The urethane reaction may be promoted by an accelerator or catalyst, although polyurethanes have been formed without the use of any accelerator. Tertiary amines having no active hydrogen atom cannot add to the isocyanate group but do make good catalysts. The base strength of a particular tertiary amine is not necessarily the sole criterion for catalytic activity since steric effects are also important. Among the catalysts or accelerators which can be used are alcohols, amino, and diamino compounds. Examples include 1,4-butane diol, N-methyl morpholine, dimethyl ethanolamine, triethylamine, N,N'-diethylcyclohexylamine, N,N'-dimethylcyclohexylamine, dimethylhexahydroaniline, diethylhexahydroaniline, and cobalt naphthenate. The amount of catalysts used does not appear to be critical; from 3 to 20 parts by weight of the catalysts per 100 parts by weight of a polyester resin have been used although quantities outside of this range are also effective.

USE OF ADHESIVE AND POLYURETHANE

In general, the surface of a metal workpiece is cleaned and then the present adhesive is applied as by brushing. The adhesive may be heated if necessary to melt the thermoplastic polyvinyl resin without unduly accelerating the chemical action of the polyisocyanate. The metal workpiece may also be heated if desired. Should the adhesive admixture be too viscous, it may be diluted with a suitable organic solvent such as methyl ethyl ketone. The thickness of the adhesive coat is not critical although the surface should be completely covered. Before the cement has an opportunity to harden or set (which may be about 30 minutes or longer), the polyurethane is applied over the adhesive and the assembly allowed to dry.

The application of the polyurethane may be in solid form or as a melt. A melt is preferred since the polyurethane is then also heated, and this facilitates the desired affinity and/or reaction with the isocyanate and the ultimate adhesion of the polyurethane to the metal.

It is chiefly in connection with adhering cross-linked polyurethanes to metal that the present adhesive finds its greatest value and, more particularly, with completely reacted cross-linked polyurethanes, that is, polyurethanes cross-linked to a degree obtained by post-curing. As herein used, the term "post-curing" means so treating the cross-linked polyurethane that there are substantially no free isocyanate groups. For example, post-curing can be carried out by heating the polyurethane within the range of about 100° C. to about 130° C. for about 15 to about 80 hours.

As described and claimed in prior copending applications Serial No. 723,949 (now abandoned), Serial No. 785,228, and Serial No. 814,302, of which we are co-inventors along with others, completely cured cross-linked polyurethanes have been previously regarded as thermosetting and incapable of acquiring thermoplastic properties. Such applications are hereby incorporated by reference. However, it has now been discovered that even cross-linked polyurethanes, post-cured as described, have latent thermoplastic properties when sufficiently heated and can be extruded, injection molded, and the like without undue haste, that is, without a danger of the polymer becoming infusible as is the case with thermosetting resins. Advantage is taken of this previously unknown attribute of post-cured polyurethanes in adhering them to metal with the present adhesive and especially in injection molding cross-linked polyurethanes.

For example, in practice the initial reaction may be treated as a molding step or the material may be merely cast as a slab in order to provide a practical manner of physically obtaining the polyurethane. Or if desired, the material may be allowed to "thermoset" within the reaction kettle. The material may be subsequently postcured in an oven at about 110° C. for about 24 hours to complete the initial reaction although this is not necessary.

Following the post-curing, the cross-linked polyurethane is again heated at a temperature above the original or first molding temperature, whereupon the material has surprisingly been found to behave as though thermoplastic. The lowest or initial temperature at which thermoplasticity begins varies for different polyurethanes but can easily be determined by simple trial and error. However, for most polyurethanes thermoplasticity can be realized above 300° F. and generally within the range of about 300° F. to about 500° F.

While the polyurethane material is thus in a flowable state, as contrasted with the sticky, "chewing gum" consistency of rubber when it is heated to a melting or flow point, the polyurethane is cast over the adhesive-coated metal to which it is to be adhered. There is no need for haste since the thermoplastic properties remain for an appreciable length of time. The adherent assembly is then allowed to cool.

If the polyurethane is to be injection molded, following either the initial reaction or the post-curing operation, the "thermoset" polyurethane material may be converted to a granular or pelletized form. The granules or pellets are then fed to known plastic molding machines wherein the polyurethanes are heated to thermoplasticity and then molded as desired. For instance, referring to FIGURE 1, an injection cylinder 32 has a hopper 33 and a plunger 34. The latter is reciprocated axially of the cylinder 32 in a manner understood in the art. Electrical heating elements or bands 35, 36, and 37 embrace the extrusion cylinder 32, and also a spread 38 is supported within the cavity of the cylinder 32. An annular cartridge 39 encircles the spreader 38 and has many fine passages 39a. A nozzle 40 conducts the material into a mold comprising a stationary section 41 and a movable mating section 42. These sections together form a sprue and runner defining a plurality of shapes or voids which are to receive the molding material.

Figure 2:
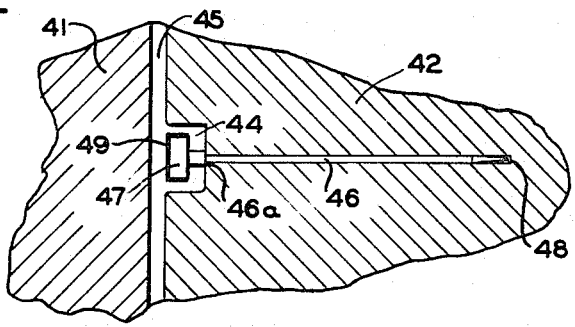
FIGURE 2 is a greatly enlarged fragment of the mating mold sections of FIGURE 1 and shows a nail about to receive an injection of a moldable polyurethane material to form a toplift.
Figure 3:
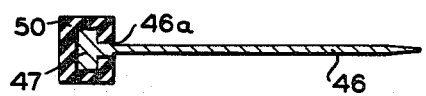
FIGURE 3 is a longitudinal cross-section of the nail of FIGURE 2 with its molded head after the molding step and removal from the mold sections.

As shown in FIGURES 2 and 3, the movable section 42 has a cavity 44 to define the actual molding area. A plurality of such cavities are interconnected between the interface of sections 41 and 42 by runners 45 of relatively small dimension. In making a toplift for shoes, the shank of a nail 46 having a head 47 is inserted in a well 48 in the section 42. The well may make a slight frictional contact with the nail 46 better to retain it, although in FIGURE 1 for clarification the well is shown somewhat oversized. In any event the shank or nail 46 has an enlarged shoulder portion 46a which is oversized with respect to the well 48 and butts against it during the injection molding. In this manner, the shoulder portion 46a prevents moldable material from entering the well 48 while suitably positioning the head 47 within the cavity 44. A coat of the present adhesive is applied to the head 47 as shown at 49.

In operation, pellets 43 are fed through the hopper 33 to the interior of the injection cylinder 32. As the pellets are forced to the right of FIGURE 1 by the plunger 34 and through the cartridge 39, the pellets 43 are heated by the bands 35, 36, and 37 above their original forming temperature and to a state of plasticity in which the fluid material resulting thereby is easily injected into the sprue and runner areas between the mold sections 41 and 42.

Special demands are made on adhesives for injection molding. Sometimes when the moldable material reaches the mold sections, its temperature has dropped so that the adhesive is ineffective. On the other hand, heating the moldable material to a higher temperature makes it too fluid or "soupy" to be suitably injection molded. The present adhesives are sufficiently sticky that even should an appreciably large drop in temperature occur in the moldable material, an acceptable adhesion is obtained.

After cooling, the molded article is removed to form a toplift as shown in FIGURE 3 having a polyurethane molded portion 50. The thermoplastic polyvinyl resin has adhered well to the metal head 47, while the polyisocyanate component of the adhesive has an affinity for the polyurethane defining the head 50. Particularly when active hydrogen atoms are available in the polyurethane, the latter reacts with the isocyanate radical in the adhesive. In use, the nail 46 is lodged longitudinally of the heel of a lady's shoe. Injection molding has been performed with polyurethanes reheated for a second molding step to a temperature within the range of about 325° F. to about 400° F.

In order to demonstrate the invention, the following examples are set forth for the purpose of illustration only. Any specific enumeration or detail mentioned should not be interpreted as limitations of the invention unless specified as such in one or more of the appended claims and then only in such claim or claims.

*Example I*

A steel plate to which it was desired to adhere a polyurethane was degreased in a chlorinated solvent such as carbon tetrachloride and then shot blast with steel shot to increase the surface area. After this the plate was again degreased in a chlorinated solvent and then plated with zinc by a conventional electrolytic method. The zinc plating is not critical to the invention but is ordinarily followed as a rust preventive measure.

A polyvinyl chloride resin (Goodrich 11030 cement) was then mixed with polymethylene polyphenylisocyanate in a ratio of about 100 to 8 parts by weight, respectively. A thin coat of the compounded adhesive or cement was then brushed over the heated steel plate and allowed to air dry for 1 to 3 hours. The steel plate was heated over a hot plate to the temperature of about 100° F. to about 130° F. and polyurethane melt was then cast on the cement coat and over the steel plate. The assembly was then allowed to cool to room temperature. It was found that excellent adhesion had taken place between the polyurethane cast and the steel plate. From 200 to 250 pounds per linear inch were required to strip the polyurethane from the plate. By pounds per linear inch is meant the pull in pounds required to pull away a one inch wide piece of polyurethane from a metal base to which it is adhered. Ordinarily, a product of this type comprising polyurethane adhered to a steel plate will be subsequently treated by heating to improve the physical properties, such as compression set, of the product. For example, the product can be heated at about 230° F. for about 24 hours.

*Example II*

A procedure was carried out like the procedure of Example I except that heads of nails were prepared as described and placed in a mold head of a Van Dorn injection molding machine as illustrated in FIGURES 1 and 2.

When the metal nails were so inserted in the mold head, the temperature thereof was about 100° F. to about 130° F. The polyurethane was injected into the molds at a temperature of about 325° F., allowed to dwell about 40 seconds, and then removed from the mold sections. The resulting molded article was then heated at about 230° F. for 24 hours to acquire a compression set to prevent subsequent creep.

The polyurethane employed in this example was prepared as follows. A linear polyester resin was conventionally formed by reacting about 14 to 15 parts by weight of ethylene glycol with about 13 parts by weight of adipic acid until the reaction product had a hydroxyl number of about 54, indicating a molecular weight of about 2,000. The excess glycol was then removed and the polyester resin was then degreased. Diphenylmethane-4,4'-diisocyanate was added to the vessel in excess of the ratio of 2 mols of diphenylmethane-4,4'-diisocyanate to 1 mol of the polyester. The mixture was stirred, heated at about 293° F. and further degassed for about 25 minutes after which a cross-linking agent hydroquinone was added in molar quantities substantially equal to the number of mols of the polyester. The resulting mixture was then further stirred for about 30 seconds at 260° F. In less than 4 minutes the material had gelled. The reaction product was then post-cured in an oven at 110° C. for 24 hours. After granulating the post-cured polyurethane, the granules were fed as described to the molding machine.

Although the polyurethane and metal head of each nail were relatively cool at the time they were joined, although the time under the injection pressure was quite short, although the cement did not flow under the pressure of the injection, and although the polyurethane was in a cross-linked, post-cured form, an excellent adhesion between the polyurethane and metal was unexpectedly obtained. In one series of tests, it required a pull of 300 to 340 pounds per square inch to strip a polyurethane toplift from a nail head. In comparison, and under exactly similar conditions where an epoxy resin was used as the cementing agent, only 40 pounds per square inch were required to strip the toplift from the nail. We have also tried numerous other known cements with decidedly poor results. For example, we have used as the adhesive, Estane (a gum urethane prepolymer produced by the B. F. Goodrich Company) alone and with polymethylene polyphenylisocyanate. In neither case were the results comparable to those obtained with the present adhesive.

Other polyurethanes and isocyanates as herein disclosed can be used in the manner of examples I and II.

It will now be apparent that we have provided an improved adhesive for securing a polyurethane to a metal base or workpiece. Our adhesive may also be used with a cross-linked polyurethane including those cross-linked to a degree obtained by post-curing but still preferably containing active hydrogen atoms. Further, our adhesive is uniquely adapted for use in injection molding polyurethanes on or about a metal workpiece.

Other forms embodying the features of the invention may be employed, change being made as regards the features herein disclosed, provided those stated by any of the following claims or the equivalent of such features be employed.

We therefore particularly point out and distinctly claim as our invention:

1. A method of cementing to a metal workpiece a previously chemically-reacted essentially cross-linked polyurethane formed by reacting an organic polymer having terminal hydroxyl groups with a stoichiometric excess amount of an organic polyisocyanate to provide a polyurethane having reactive hydrogen atoms but being substantially free of reaction hydroxyl groups, said method comprising the steps of applying an adhesive coat over the workpiece of a flowable cementing admixture consisting essentially in parts by weight of about 3 to about 20 parts of an organic polyisocyanate and about 90 to about 110 parts of a thermoplastic polyvinyl resin, heating the preset essentially cross-linked polyurethane remote from the workpiece to a temperature within the range of about 300° F. to 500° F. to melt the polyurethane, covering such adhesive coat before it has dried with the hot polyurethane melt, and then using the heat of the melt to react isocyanate groups of the polyisocyanate in the adhesive coat with said non-hydroxyl reactive hydrogen atoms in the previously chemically reacted and melted polyurethane substantially to effect the cementing operation, said polyvinyl resin serving principally as a carrier for the polyisocyanate and being adherent to such metal workpiece.

2. The method of claim 1 wherein said polyvinyl resin is selected from the group consisting of polyvinyl acetate, polyvinyl alcohol, polyvinyl butyral, polyvinyl chloride, polyvinylidene chloride, polyvinyl formal, and copolymers thereof.

3. The method of claim 1 wherein said organic polyisocyanate is a polyaryl isocyanate.

4. The method of claim 1 wherein such covering of the coat of flowable admixture with the hot polyurethane melt is by injection molding to force the polyurethane melt against such coat and workpiece.

5. The method of claim 1 wherein said organic polyisocyanate is polymethylene polyphenylisocyanate.

6. The method of claim 1 wherein said metal surface is the head of a nail and said cementing admixture and polyurethane are applied to said head to form a toplift.

References Cited by the Examiner

UNITED STATES PATENTS

| | | | |
|---|---|---|---|
| 2,266,432 | 12/1941 | Morin et al. | 18—59 |
| 2,277,083 | 3/1942 | Dorough | 117—100 |
| 2,579,951 | 12/1951 | Morin et al. | 22—58 |
| 2,724,303 | 11/1955 | Holcomb. | |
| 2,784,630 | 3/1957 | Koprow et al. | 117—17 |
| 2,910,381 | 10/1959 | Nogel | 117—75 |
| 2,992,939 | 7/1961 | Larson et al. | 117—132 |
| 3,023,126 | 2/1962 | Underwood et al. | 117—138.8 XR |

FOREIGN PATENTS

| | | |
|---|---|---|
| 783,615 | 9/1957 | Great Britain. |
| 203,836 | 10/1956 | Australia. |

OTHER REFERENCES

"Rigid Urethane Foams-11 Chemistry and Formulation," by Barringer, E. I. du Pont de Nemours and Company Technical Bulletin HR–26, April 1958 (page 43 relied on).

RICHARD D. NEVIUS, *Primary Examiner.*